(12) United States Patent
Flöter et al.

(10) Patent No.: US 7,547,458 B2
(45) Date of Patent: *Jun. 16, 2009

(54) PARTICULATE CREAMER COMPRISING FAT AND FOOD COMPOSITIONS COMPRISING SAID CREAMER

(75) Inventors: Eckhard Flöter, Vlaardingen (NL); Gabriel J. Lansbergen, Vlaardingen (NL); Rainer Weisbecker, Bad Orb (DE)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 504 days.

This patent is subject to a terminal disclaimer.

(21) Appl. No.: 10/535,488

(22) PCT Filed: Oct. 29, 2003

(86) PCT No.: PCT/EP03/12033

§ 371 (c)(1), (2), (4) Date: May 17, 2005

(87) PCT Pub. No.: WO2004/045298

PCT Pub. Date: Jun. 3, 2004

(65) Prior Publication Data

US 2005/0281935 A1 Dec. 22, 2005

(30) Foreign Application Priority Data

Nov. 18, 2002 (EP) .................................. 02079833

(51) Int. Cl.
*A23D 9/00* (2006.01)

(52) U.S. Cl. .......................... 426/99; 426/96; 426/601; 426/607

(58) Field of Classification Search ................. 426/607, 426/96, 99, 601

See application file for complete search history.

(56) References Cited

U.S. PATENT DOCUMENTS

| 4,016,302 A | * | 4/1977 | Kattenberg et al. ......... 426/607 |
| 4,126,710 A | * | 11/1978 | Jaworski et al. ............. 426/589 |
| 4,702,928 A |   | 10/1987 | Wieske et al. |
| 5,332,585 A |   | 7/1994 | Odermatt et al. |
| 5,718,938 A | * | 2/1998 | Cain et al. .................... 426/549 |
| 5,756,143 A | * | 5/1998 | Cain et al. .................... 426/606 |
| 5,858,427 A |   | 1/1999 | Cain et al. |
| 5,939,114 A |   | 8/1999 | Cain et al. |
| 2002/0009518 A1 |   | 1/2002 | Soe |
| 2002/0098275 A1 | * | 7/2002 | Bodnar et al. ................ 426/612 |

FOREIGN PATENT DOCUMENTS

| EP | 0 545 463 | 6/1993 |
| EP | 1 038 444 | 9/2000 |
| EP | 1 249 172 | 10/2002 |
| WO | 96/39855 | 12/1996 |
| WO | 97/16978 | 5/1997 |

OTHER PUBLICATIONS chemical compound .Encyclopaedia Britannica. 2007. Encyclopaedia Britannica Online. Nov. 15, 2007 available at http://www.search.eb.com/eb/article-79717.*
European Search Report on Application No. EP 02 07 9833 dated Feb. 27, 2003 with attached abstract.
Co-pending Application for Floter et al. U.S. Appl. No. 10/535,484, filed May 17, 2005.

* cited by examiner

*Primary Examiner*—Lien Tran
*Assistant Examiner*—Kelly Bekker
(74) *Attorney, Agent, or Firm*—Ellen Plotkin

(57) ABSTRACT

Particulate compositions comprising 10-90% wt of a matrix material and 10-90% wt of triglycerides of fatty acids, wherein of said triglycerides the amount of H3 (triglyceride of 3 saturated fatty acids of 16 or more carbon atoms) and H2U (triglyceride of 2 saturated fatty acids of 16 or more carbon atoms and 1 cis-unsaturated fatty acid) taken together is at least 55% wt based on the total amount of triglycerides, wherein the compositions are preferably low in triglycerides of transunsaturated fatty acids, for use as for example a creamer and/or whitener. The invention also relates to a process for preparing such particulates and food products containing such creamer.

5 Claims, No Drawings

PARTICULATE CREAMER COMPRISING FAT AND FOOD COMPOSITIONS COMPRISING SAID CREAMER

FIELD OF THE INVENTION

The present invention relates to particulate compositions suitable for use as creamer and/or whitener and/or non-dairy cream alternative, and in particular such compositions comprising triglycerides of fatty acids, wherein the composition is low in triglycerides of trans-unsaturated fatty acids. The invention further relates to a process for manufacturing such compositions and food products containing such creamer and/or whitener and/or non-dairy cream alternative.

BACKGROUND OF THE INVENTION

Food compositions (and in particular savoury food compositions) contain in many cases fat. This is especially the case for particulate and/or pasty compositions like preparations for instant cream-style soups and sauces, which to a large extent consist of fat, starch or a starchy matter, and salt and flavourings. Particulate in this context is to be understood as powder, flakes, cubes, pellets etcetera (i.e. non fluid).

(Mixtures for) cream-style soups and sauces as above referred, but also other products such as instant dishes like pasta with a sauce or wet soups and sauces often contain an ingredient which is referred to as a creamer, and/or creamer/whitener, and/or creamer/thickener, and/or non-dairy cream. These products usually contain fat blends that can provide a creamy taste and/or mouthfeel and/or improved body and/or viscosity and/or a whitening effect. Such products (herein after called creamers for brevity) can also be in the form of e.g. tablets as a non-dairy cream alternative. To be suitable in these applications the fat blends must have the appropriate physical properties in terms of melting behaviour, crystallisation behaviour, brittleness, organoleptic properties, taste, as well as physical and chemical stability. In order to increase stability, shelf life and solubility, the fat blends are commonly encapsulated or (partly) coated with another material, e.g. hydrophilic film forming materials. In such encapsulates or partly coated fats, the individual fat blend particles as well as clusters of fat blend particles are at least partially covered and/or surrounded by the encapsulation material. The fat blends should therefore also be suitable for being submitted to encapsulation and drying processes in order to form free flowing and highly dispersible products. The covering or encapsulation material often contributes to the properties of the creamer.

The fats in savoury compositions described above usually comprise a considerable amount triglycerides of fatty acids (hereinafter for short: triglycerides). Fats are usually mixtures of various triglycerides. The type of fat or fat blend used for a given purpose is determined (next to availability and price) by e.g. the properties the fat has and how it performs in a given product, and in the manufacture of such product. The fat should perform well on e.g. taste, melting in the mouth, taste keepability, but also on ability to be processed into a suitable product as well as performance in the packed product, e.g. keepability (in particular fat staining for cubes packaged in cardboard).

The triglycerides (which form part or all of the fat) are usually obtained from vegetable sources and may have been subjected to various treatments, such as fractionation (dry or wet), purification, hardening, interesterification, blending etcetera, to give the fat the desired product properties. Hardening unsaturated fat or triglycerides to saturated or partially unsaturated fat or triglycerides is in particular a tool used to obtain the desired melting behaviour. In this way, oils or soft fats can be turned into fats showing more suitable properties for solid or dry formulations.

The hardening process (in particular partial hardening) may lead to formation of a certain amount of so-called trans-unsaturated fatty acids (and/or triglycerides containing such trans-unsaturated fatty acids as acyl moiety), in short TFA's. For various reasons it may be desired to reduce or eliminate the amount of trans-unsaturated fatty acids (and triglycerides thereof) in products. For spreads (margarines and the like) a wide range of possible alternative fats and triglycerides are proposed, as is disclosed in e.g. WO 97/16978 and WO 96/39855.

The triglycerides mentioned in such applications frequently contain lauric acid (C12 saturated fatty acid). It has been found that when one wishes to find an alternative for the trans-unsaturated fatty acids (and fats containing them) in savoury-type food applications (in which the creamers are often used) lauric acid (and its triglycerides) is undesired. Lauric acid and triglycerides containing lauric acid may show a range of desirable properties, in particular melting behaviour, but in a savoury food application triglycerides of lauric acid were found to lead to a (soapy) off-flavour, especially after prolonged storage.

Hence, there is a desire for creamer, and/or creamer/whitener, and/or creamer/thickener, and/or non-dairy creamer alternative and also (savoury) food compositions such as (mixtures for) cream-style soups and sauces, (instant) food compositions, meal makers and others that contain such creamer, or creamer/whitener, and/or creamer/thickener, and/or non-dairy creamer alternative, wherein the creamer, and/or creamer/whitener, and/or creamer/thickener, and/or non-dairy creamer alternative which contain triglyceride fats which are low in trans-unsaturated fatty acids (e.g. below 5% of the total fats present, preferably less than 2%). Still such creamer, and/or creamer/whitener, and/or creamer/thickener, and/or non-dairy creamer alternative should be not too difficult to manufacture and process in comparison to the conventional products, and should still perform well in a (savoury) food composition comprising carbohydrates, in particular concerning processability, fat staining, crystallisation, mouthfeel, and other characteristics as mentioned above.

Preferably, such product should also be low in lauric acid or triglycerides thereof (e.g. below 10% of the total fats present, preferably less than 3%, most preferably less than 0.5% wt of the total fats present). Also, the alternative fats should combine well with the coating/encapsulation material. Suitable encapsulation material for the creamers etcetera according to the invention are edible proteins such as for example milk proteins, hydrolysed proteins, edible carbohydrates, such as for example starch or modified starches as well as sugars, sugar syrups or sugar derivatives, dextrines or maltodextrines etcetera. The creamers in the form of encapsulated or covered fat usually contain 20-80% wt of encapsulation material, based on the total creamer.

Triglyceride fats can be grouped according to the fatty acids of which they consist (i.e. the acyl moiety of triacyl glycerides). Such groups can be identified by a letter, and herein:

H means saturated fatty acid of 16 carbon atoms or longer (C16+, e.g. up to C24)

U means unsaturated fatty acids in cis conformation (any chain length)

E means unsaturated fatty acids in trans conformation (any chain length)

M means saturated fatty acids of 10-14 carbon atoms (C10-C14)

As the present application is about triglycerides of such fatty acids, the fatty acid composition of the triglycerides is given by for example:

H3 (meaning a triglyceride of 3 saturated fatty acids of 16 or more carbon atoms)

H2E (meaning a triglyceride of 2 saturated fatty acids of 16 or more carbon atoms and 1 trans-unsaturated fatty acid)

H2M (meaning a triglyceride of 2 saturated fatty acids of 16 or more carbon atoms and 1 saturated fatty acid of 10-14 carbon atoms)

H2U (meaning a triglyceride of 2 saturated fatty acids of 16 or more carbon atoms and 1 cis-unsaturated fatty acid)

HE2 (meaning a triglyceride of 1 saturated fatty acid of 16 or more carbon atoms and 2 trans-unsaturated fatty acids), and so on for other 3 letter codes.

Fat compositions can thus be characterised in containing certain weight percentages (based on the total amount of triglycerides) of triglycerides of the above codes.

Although it is mentioned for E and U that they may have any length, it is to be understood that this relates to fatty acids of approx. 8-24 carbon atoms, and more usually 16-20 carbon atoms.

EP 1038444 discloses hard butter compositions for use in chocolate, wherein said hard butter component comprises 50-80% SUS triglycerides (S being C16 and C18 saturated fatty acids, U being C15 and C18 unsaturated acids) and is free from trans acids and lauric acids.

U.S. Pat. No. 5,858,427 discloses compositions for use as coatings on ice creams, said compositions comprising 20-60% sugar, 20-70% fat, 0-30% protein. The fat is preferably low in trans unsaturated fatty acids and contains 25-80% SUS (S being saturated fatty acids of 16-24 carbon atoms, U being unsaturated acids of 18 or more carbon atoms), and the fat has a specified melting behaviour ($N_0$ of 40-80, $N_{20}$ of 15-60, $N_{25}$ of 2-20). The compositions can be made by mixing all ingredients.

EP 545463 discloses a fat blend for confectionary (chocolate) not needing tempering, which fat blend is low in trans fatty acids, and which blend comprises more than 50% SUS (S being saturated fatty acids of 16-24 carbon atoms, U being C18:1 and C18:2) and less than 30% S'OS' (S' being saturated fatty acids of 16-18 carbon atoms, 0 being C18:1).

U.S. Pat. No. 5,939,114 discloses ice cream coating compositions with reduced waxiness and a low content of trans unsaturated fatty acids, wherein the fat composition contains less than 10% SSS, 25-80% SUS. 2-20% SSU, 8-60% SUU and USU, less than 10% UUU (S being saturated fatty acids of 16-24 carbon atoms, U being unsaturated acids of 18 or more carbon atoms). The coating composition may contain (next to 20-70% of said fat) the usual ingredients for such compositions: 25-60% sugar, and 0-30% cocoa powder, milk proteins, flavours and emulsifiers. The compositions can be made by mixing all ingredients.

U.S. Pat. No. 5,718,938 discloses manufacturing a batter, a dough, and bakery products such as cookies and cakes with lower than normal SAFA (saturated and trans fatty acid residues).

WO 94/16572 discloses manufacturing a (homogeneous) puff-pastry margarine containing at least 60% fat, the fat being free of trans fatty acids.

SUMMARY OF THE INVENTION

It has now been found that the objectives as given above may be met (at least in part) by particulates comprising 10-90% wt (preferably 20-85%) of a matrix material and 10-90% wt (preferably 15-80% wt) of triglycerides of fatty acids, wherein of said triglycerides the amount of H3 (triglyceride of 3 saturated fatty acids of 16 or more carbon atoms) and H2U (triglyceride of 2 saturated fatty acids of 16 or more carbon atoms and 1 cis-unsaturated fatty acid) taken together is at least 55% wt based on the total amount of triglycerides, preferably at least 65% % wt based on the total amount of triglycerides. In other words: H3+H2U≧55%, preferably ≧65% wt, based on total triglycerides.

In the particulates according to the invention it may be preferred that the triglycerides of fatty acids are dispersed in the matrix material, preferably as discrete regions. More preferably, the triglycerides of fatty acids are dispersed in the matrix material as oil or fat droplets, crystals or particles. As an alternative or more specific embodiment, said triglycerides of fatty acids are preferably present as oil or fat droplets or crystals which droplets or crystals are at least partly covered by or encapsulated with the matrix material.

It is preferred that the matrix material comprises at least a protein or a carbohydrate, but preferably both a protein and a carbohydrate are both present in the matrix material (e.g. in a ratio by weight protein: carbohydrate of between 1:0.2 and 1:20). Preferred proteins for the purpose of the invention are dairy protein, hydrolysed protein, gelatin, soy protein, or mixtures thereof, with dairy proteins (e.g. whey protein or caseinate) being most preferred. Suitable carbohydrates in the present invention are maltodextrin, sugar, sugar derivative, starch, chemically modified starch, physically modified starch, xanthan, guar, locust bean gum, alginate, pectin, carrageenan, polydextrose, or mixtures thereof.

In the present invention it is preferred that at least 60% by weight of the particulates (i.e. triglycerides plus matrix material) has a size of 1-1000 μm, preferably 10-600 μm. It is also preferred that at least 60% by weight of the oil or fat droplets, crystals or particles has a size of 0.05-100 μm, preferably 0.1-20 μm.

The particulates according to the invention are often "dry" preparations. However, such compositions still may contain a considerable amount of water, e.g. as a result of an incomplete dehydration process or as a result from water naturally present in the constituents, such as moisture in flour. The amount of moisture present in the compositions according to the invention is preferably below 30% wt (based on the total composition), more preferably less than 20% wt, most preferably less than 10% wt.

It may be preferred that the particulates comprise 10-90% wt (preferably 15-80% wt) of triglycerides of fatty acids, which particulates are preferably at least partly covered or encapsulated by 10-90% wt (preferably 20-85%) of an encapsulating or covering material, wherein the amount of H3 (triglyceride of 3 saturated fatty acids of 16 or more carbon atoms) and H2U (triglyceride of 2 saturated fatty acids of 16 or more carbon atoms and one cis-unsaturated fatty acid) taken together in the creamer particulates is at least 55% wt based on the total amount of triglycerides. As is mentioned before, the fat blends are preferably encapsulated by or (partly) coated with another material, e.g. hydrophilic film forming materials. In such encapsulates or partly coated fats, the individual fat blend particles as well as clusters of fat blend particles are at least partially covered and/or surrounded by the encapsulation material. Such covering or encapsulation material preferably comprises a protein and/or a carbohydrate. Examples of such proteins protein are dairy protein, hydrolysed protein, gelatin, soy protein, or mixtures thereof. Examples of such carbohydrate are maltodextrin, a sugar, sugar syrup, a sugar derivative, starch, chemically modified starch, physically modified starch, xanthan, guar, locust bean gum, alginate, pectin, carrageenan, polydextrose, or mixtures thereof.

Hence, it is now possible to manufacture e.g. creamer and/or whitener and/or non-dairy cream alternative-type products which contain a large proportion of vegetable fats, wherein the fats contain less than 5%, preferably less than 2% wt of trans-unsaturated fatty acids (as triglycerides), and preferably having less than 10% wt (more preferably less than 3%, most preferably less than 0.5%) of triglycerides of lauric acid, and wherein the fats still have appropriate melting and crystallisation behaviour for manufacturing, storage and use. Thus, the invention further relates to a creamer and/or whitener and/or non-dairy cream alternative-type product comprising 10-90% wt (preferably 20-85%) of a matrix material and 10-90% wt (preferably 15-80% wt) of triglycerides of fatty acids (preferably dispersed in the matrix material as discrete regions or as oil or fat droplets, crystals or particles), wherein at least 50% of the fats is of vegetable origin, and which composition is substantially free from trans-unsaturated fatty acids or triglycerides thereof. Preferably, the compositions according to the invention are substantially free from animal fat. The invention also relates to creamers and/or whiteners and/or non-dairy cream alternatives comprising 10-100% of the particulates according to the invention.

The manufacturing process of the particulates comprising 10-90% wt (preferably 20-85%) of a matrix material and 10-90% wt (preferably 15-80% wt) of triglycerides of fatty acids, wherein of said triglycerides the amount of H3 (triglyceride of 3 saturated fatty acids of 16 or more carbon atoms) and H2U (triglyceride of 2 saturated fatty acids of 16 or more carbon atoms and 1 cis-unsaturated fatty acid) taken together is at least 55% wt based on the total amount of triglycerides, wherein at least 60% by weight of the particulates has a size of 1-1000 μm, suitably involves the steps of:

preparing an emulsion or dispersion of 10-90% wt (preferably 15-80% wt) of triglycerides of fatty acids, wherein of said triglycerides the amount of H3 (triglyceride of 3 saturated fatty acids of 16 or more carbon atoms) and H2U (triglyceride of 2 saturated fatty acids of 16 or more carbon atoms and 1 cis-unsaturated fatty acid) taken together is at least 55% wt based on the total amount of triglycerides, and 10-90% wt (preferably 20-85%) of a matrix material in an aqueous liquid, drying said emulsion or dispersion.

Said drying is preferably done by spray-drying but other drying processes such as for example heat drying (including vacuum freeze drying), air drying etc can also be employed. The emulsion or dispersion of the fat and matrix material in an aqueous liquid can be prepared by means as known in the art, e.g. high shear mixing (optionally followed by homogenising), membrane emulsification techniques, or other means.

The invention further relates to the use of the particulates according to the invention as creamer and/or thickener and/or whitener and/or non-dairy cream alternative. Such creamer and/or thickener and/or non-dairy cream alternative can be in the form of a cube, pellet or tablet.

The invention also relates to (savoury) food compositions comprising the particulates according to the invention. Hence, the invention further relates to a composition comprising 2-50% wt salt, 0-30% wt MSG, 0-20% wt herbs and/or spices, 0-30% wt vegetable particulates, 0-30% wt starch-based thickener and further comprising 0.1-65% wt (preferably 2-50% wt) of the particulates according to the invention. Such (savoury) compositions can be in the form of flakes, granules, powder or agglomerated or pressed to a cube, pellet, or tablet, and can be intended e.g. as a soup or sauce concentrate.

The (dry) particulates according to the invention can also be applied in liquid or pasty products (e.g. savoury products) in which a creaming effect is desired. Such liquid or pasty products usually contain some water, and when the particulates according to the invention are incorporated in such liquid or pasty products the dry particulates will generally melt and/or dissolve, and no longer be visible as such. Examples of such liquid or pasty products arm wet soups and sauces, which are often pasteurised, aseptically packaged, or sterilised products (as replacer for e.g. liquid cream). Hence, the present invention further relates to a process for preparing a liquid or pasty sauce, soup or concentrate of such a sauce or soup or concentrate, which process includes the step of including 0.1-85% wt (preferably 2-50% wt) of the particulates according to the invention as set out herein in such liquid or pasty sauce, soup or concentrate of such a sauce or soup or concentrate.

DETAILED DESCRIPTION OF THE INVENTION

In the present invention it means that of the total amount of triglycerides present in the particulates at least 55% wt (preferably at least 65% wt) are triglycerides of fully saturated C16 and longer chains (e.g. C16, C18, C20, C22 and C24) and/or triglycerides containing one cis-unsaturated fatty acid of any chain length and two saturated fatty acids of 16 or more carbon atoms. In connection to this, it is believed that the creamers, whiteners, non-dairy cream alternatives, etcetera as currently on the market in particulate form contain about 30-50% of such H3+H2U triglycerides as part of their fats.

In the particulates according to the invention it is preferred that the amount of H3 (triglyceride of 3 saturated fatty acids of 16 or more carbon atoms) is at least 15% wt based on the total amount of triglycerides in the particulates, preferably at least 20%. Likewise, it is preferred that the amount of H2U (triglyceride of 2 saturated fatty acids of 16 or more carbon atoms and 1 cis-unsaturated fatty acid) taken together is at least 40% wt based on the total amount of triglycerides in the particulates.

Apart from the amounts of H3 and H2U it can be preferred to use fats in such particulates in a particular ratio. In this case, the ratio H3/H2U is preferably between 0.5 and 1.2.

Regarding the basic fatty acid composition, it is preferred that the amount of H (i.e. saturated fatty acids of 16 or more carbon atoms) is between 60 and 75% wt based on total amount of fatty acids. Normally, only fatty acids are used with even number of carbon atoms. Similarly, it is preferred that the amount of U (cis-unsaturated fatty acids of any suitable chain length) is between 20 and 45% wt based on total amount of fatty acids.

In the particulates according to the invention the amount of palmitic fatty acid (C16:0) in the triglycerides is preferably between 30 and 70%, more preferably between 40 and 60% wt based on the total amount of fatty acids.

The invention thus also relates to (savoury) food compositions comprising the particulates as set out above, such as sauce and soup concentrates. Such (savoury) food compositions according to the invention can be any physical format, but the invention is most suitable for savoury compositions that are in the form of pasty or particulate matter. Particulate matter is herein to be understood to comprise e.g. flakes, powder, cubes, pellets, tablets. In the case of cubes, pellets, tablets it may be needed to use a technique such as agglomerating or pressing the particulates according to the invention to obtain such shapes. The (savoury) food compositions as set out above usually contain additional material, such as 2-50% wt salt, 0-30% wt MSG, 0-50% fat, 0-20% wt herbs and/or spices, 0-30% wt vegetable particulates, 0-30% wt starch-based thickener and further comprising 0.1-30% wt of the particulates according to the invention. Examples of such (savoury) food compositions are soup- and sauce concentrates (which yield a soup or sauce upon dilution and heating with an aqueous liquid). The (savoury) compositions above may be in the form of flakes, granules, powder or agglomerated or pressed to a cube, pellet, or tablet.

The savoury food compositions as set out above may further comprise (e.g. in an amount of 0.1-50% wt) one or more of the following ingredients: herbs and/or spices, tomato powder, vegetable pieces, monosodium glutamate and other components.

The particulates can be used as such (in any physical shape), as part of a dry (as defined above) composition e.g. a soup or sauce concentrate, but the particulates may also be used in liquid or pasty formulations.

EXAMPLES

Example 1

Four Different Fat Blends for Use in Creamers

Fat blends A-D were prepared from various known fats and fats specifically produced according to the top half of the table 1. In the second half of that table the fatty acid composition is given in accordance with the definitions as herein defined, as is the ratio symmetric: asymmetric triglycerides for H2U.

2 Kg fat blend was prepared by mixing 1.2 kg POs and 0.8 kg PO (blend A in the table below) and heated up 75° C. in a blending vessel under nitrogen atmosphere for 10 min. Other fat blends which can be used are B-D, with good properties. PO is palm oil. POs is a dry-fractionated palm stearin with a melting point of approx. 53° C. PO58 is fully hardened palm oil. Fatblend "comp" is a comparative, from the prior art, obtained by hardening palm oil to a melting point of approx. 44° C.

TABLE 1

|         | Comp | A    | B    | C    | D    |
|---------|------|------|------|------|------|
| PO      |      | 40   | 30   | 40   | 20   |
| Pos     |      | 60   | 70   | 50   | 80   |
| PO58    |      |      |      | 10   |      |
| PO44    | 100  |      |      |      |      |
| H3      | 12   | 25   | 27   | 31   | 29   |
| H2E     | 29   | 0    | 0    | 0    | 0    |
| H2M     | 1    | 1    | 1    | 2    | 1    |
| H2U     | 21   | 46   | 45   | 42   | 44   |
| HE2     | 10   | 0    | 0    | 0    | 0    |
| H3/H2U  | 0.55 | 0.54 | 0.60 | 0.74 | 0.67 |
| H       | 53   | 61   | 63   | 64   | 64   |
| E       | 24   | 0    | 0    | 0    | 0    |
| U       | 23   | 39   | 37   | 36   | 36   |
| Palmitic| 45   | 54   | 56   | 53   | 57   |
| H3 + H2U| 33   | 71   | 72   | 72   | 73   |

Note:
the numbers of all the fats given does not add up to 100%, as some minor amounts of other fats are also present.

Example 2

Manufacture of Different Creamers

Six different creamers were prepared having the net composition as given in table 2 below.

TABLE 2

| Ingredients Product | Carboydrates (%) | Fat (%) | Proteines (%) | Others (%) | Total (%) |
|---|---|---|---|---|---|
| Creamer a | 69   | 15 | 14 | 2   | 100 |
| Creamer b | 11.5 | 75 | 10 | 3.5 | 100 |
| Creamer c | 15   | 78 | 7  | 0   | 100 |
| Creamer d | 20.5 | 65 | 14 | 0.5 | 100 |
| Creamer e | 44   | 50 | 6  | 0   | 100 |
| Creamer f | 15   | 78 | 7  | 0   | 100 |

The carboydrates used included wheat flour, maltodextrin, lactose, glucose syrup. The milk proteins used included calcium and sodium caseinate, whey protein. The category others include minor components such as citrate and phosphate.

The processing involved for all creamers a-f the following process: all ingredients were mixed in a mixing tank with an Ultraturrax for 5 min. at 55° C. and then homogenized in a homogenizer (Schroeder) at one stage, 200 bar. The resulting suspension then was spray dried in a multi stage spray dryer (Niro). The inlet temperature was about 165° C.; the outlet temperature about 62° C. The dry particulate creamer was agglomerated for 5 minutes in an agglomeration process step (Glatt Agglomator, inlet temperature 80° C., outlet temperature 50° C.). The spray dried and agglomerated creamer was stored under cool conditions below 20° C. and used in the formulations according to the examples 3-8.

The following ingredients were used:

| Example 2a | Example 2b | Example 2c |
|---|---|---|
| 5 kg water | 5 kg water | 5 kg water |
| 0.3 kg fat blend A | 1.5 kg fat blend A | 1.56 kg fat blend A |
| 0.28 kg whey protein | 0.02 kg sodium caseinate | 0.14 kg sodium caseinate |
| 0.2 kg wheat flour | 0.18 kg calcium caseinate | 0.3 kg lactose |
| 0.58 kg maltodextrin | 0.23 kg lactose | |
| 0.6 kg lactose | 0.07 kg phosphate | |
| 0.04 kg citrate | | |

| Example 2d | Example 2e | Example 2f |
|---|---|---|
| 5 kg water | 5 kg water | 5 kg water |
| 1.3 kg fat blend A | 1 kg fat blend A | 1.56 kg fat blend A |
| 0.28 kg sodium caseinate | 0.88 kg sodium caseinate | 0.14 kg sodium caseinate |
| 0.22 kg maltodextrin | 0.12 kg Glucose syrup | 0.3 kg glucose syrup |
| 0.19 kg lactose | | |
| 0.01 kg citrate | | |

Example 3

Saffron Cream Soup

A dry soup mix for a saffron cream soup was made by mixing:

| | |
|---|---|
| Creamer as in example 2-c | 32.94% |
| Heat/moisture-treated starch, dried | 15.73% |
| Skim milk powder | 21.32% |
| Xanthan | 1.12% |
| Common salt | 4.51% |
| Citric acid granular | 0.22% |
| Powdered onion and leek | 5.55% |
| Sugar | 2.50% |

-continued

| | |
|---|---|
| Saffron powder | 0.08% |
| Various flavourings | 16.03% |

To prepare the creamy saffron soup 40 g of this dry mixture was stirred into 200 ml cold water, mixed and briefly brought to the boil.

Example 4

Mushroom Cream Soup

A dry soup mix for a mushroom cream soup was made by mixing:

| | |
|---|---|
| Creamer according to example 2-e | 28.40% |
| Heat/moisture-treated starch, dried | 14.76% |
| Skim milk powder | 22.14% |
| Xanthan | 1.05% |
| Common salt | 4.22% |
| Citric acid granular | 0.40% |
| Powdered onion and leek | 5.18% |
| Sugar | 1.10% |
| Powdered mushrooms and ceps | 14.49% |
| Various flavourings | 8.26% |

To prepare the creamy mushroom soup 40 g of this dry mixture was stirred into 200 ml cold water, mixed and briefly brought to the boil.

Example 5

Tomato Cream Sauce

A dry sauce mixture for a creamy tomato sauce was made by mixing:

| | |
|---|---|
| Creamer according to example 2-a | 28.40% |
| Heat/moisture-treated starch, dried | 14.76% |
| Tomato powder | 36.63% |
| Xanthan | 1.05% |
| Common salt | 4.22% |
| Citric acid granular | 0.40% |
| Powdered onion and leek | 5.18% |
| Sugar | 1.10% |
| Various flavourings | 8.26% |

To prepare the creamy tomato sauce 40 g of this dry mixture was stirred into 200 ml cold water, mixed and briefly brought to the boil.

Example 6

Leek Cream-Style Sauce

A dry sauce mixture for a leek cream-style sauce was made by mixing:

| | |
|---|---|
| Creamer according to example 2-d | 28.40% |
| Heat/moisture-treated starch, dried | 14.76% |
| Leek powder | 36.63% |
| Xanthan | 1.05% |
| Common salt | 4.22% |

-continued

| | |
|---|---|
| Citric acid granular | 0.40% |
| Powdered onion and leek | 5.18% |
| Sugar | 1.10% |
| Various flavourings | 8.26% |

To prepare the creamy tomato sauce 40 g of this dry mixture was stirred into 200 ml cold water, mixed and briefly brought to the boil.

Example 7

Creamer-Cube

Following the process in patent application EP 0779 039 a formed cream substitute was prepared by mixing 32.5 g spray dried cream powder (having a fat content of 75%) according to example 2-b with 32.5 g spray dried creamer (including fat blend) on the basis of caseinate, having a fat content of 75% and the mixture was mixed in 35 g of heated butter fat. The paste-like mass was extruded and formed into cubes of 7 g each by a conventional molding machine.

The cubes so-obtained were equivalent in providing creaminess to that of an amount of at least 2 tablespoons of cream. This is the amount which is generally used for refining 250 ml of food. The cubes were dispersible in hot meals and were equivalent to the addition of cream as to whitening power, creaminess, sensation in the mouth and taste. The addition of the cubes unlike the addition of cream, did not lead to a dilution of the taste or the consistency of the meals. It was possible to store the cubes without cooling.

Example 8

Potato Soup with Vegetables

A canned, creamy potato soup (1000 kg) was made by mixing with 630 kg water and 0.4% white wine the following ingredients:

| | |
|---|---|
| creamer 2-c | 1.5% |
| salt | 0.7% |
| maize starch modified | 0.7% |
| wheat flour | 0.35% |
| xanthan | 0.1% |

The mixture was maintained in a mixing tank for 10 minutes.

Then the following ingredients were added thereto:

| | |
|---|---|
| chopped potatoes fresh | 15% |
| onion slices deep frozen | 5.0% |
| pork sliced, smoked | 2.8% |
| leek slices, deep frozen | 2.8% |
| carrots slices, deep frozen | 2.8% |
| celery slices, deep frozen | 1.6% |
| potato flakes, dehydrated | 2.3% |
| garlic, deep frozen | 0.02% |
| majoran | 0.005% |
| pepper white | 0.03% |
| sunflower oil | 0.9% | and mixed thoroughly with a mixer unit for 15 minutes and heated up to 75° C. The prepared potato soup was filled in cans with a dosing system and sealed. The product was sterilised at 121° C./6 minutes holding time.

The invention claimed is:
1. Creamer, whitener or non-dairy cream alternative comprising 10-100% by wt of particulates, said particulates comprising:
    about 20-85% by wt of a matrix material comprising a protein selected from the group consisting of a dairy protein, hydrolysed protein, gelatin, soy protein, and mixtures thereof; and
    about 15-80% by wt of triglycerides of fatty acids, wherein of said triglycerides the amount of triglyceride of 3 saturated fatty acids of 16 or more carbon atoms (H3) is at least 20% wt based on the total amount of triglycerides; wherein the amount of palmitic fatty acid (C16:0) based on the total amount of fatty acids is about 30 to about 70% by wt;
    wherein of said triglycerides the amount of triglyceride of 3 saturated fatty acids of 16 or more carbon atoms (H3) and triglyceride of 2 saturated fatty acids of 16 or more carbon atoms and 1 cis-unsaturated fatty acid (H2U) taken together is at least about 55% by wt based on the total amount of triglycerides;
    wherein at least 60% by weight of the particulates have a size of 10-600 µm; wherein said triglycerides of fatty acids are dispersed in said matrix material as discrete regions; and
    wherein said particulates are at least partly covered or encapsulated by about 20 % to about 80% by wt of an encapsulating or covering material.

2. The creamer, whitener or non-dairy cream alternative according to claim 1, wherein the triglycerides of fatty acids are dispersed in the matrix material as oil or fat droplets, crystals or particles.

3. The creamer, whitener or non-dairy cream alternative according to claim 1, wherein said triglycerides of fatty acids are present as oil or fat droplets or crystals which droplets or crystals are at least partly covered by or encapsulated with the matrix material.

4. The creamer, whitener or non-dairy cream alternative according to claim 1, wherein said amount of H3 +H2U is at least 65% wt based on the total amount of triglycerides.

5. The creamer, whitener or non-dairy cream alternative according to claim 1, wherein the ratio H3 / H2U is between 0.5 and 1.2.

* * * * *